United States Patent [19]

Ichikawa

[11] Patent Number: 5,042,083
[45] Date of Patent: Aug. 20, 1991

[54] RADIO COMMUNICATION SYSTEM HAVING MEANS FOR AVOIDING SIGNAL COLLISION

[75] Inventor: Yoshio Ichikawa, Tokyo, Japan
[73] Assignee: NEC Corporation, Tokyo, Japan
[21] Appl. No.: 927,037
[22] Filed: Nov. 5, 1986

[30] Foreign Application Priority Data

Nov. 5, 1985 [JP] Japan .................. 60-248500

[51] Int. Cl.[5] .......................... H04Q 7/00; H04J 3/02
[52] U.S. Cl. ....................................... 455/33; 455/57; 370/85.3
[58] Field of Search ...................... 455/53, 54, 56, 57, 455/35, 38, 33; 340/825.44, 825.47, 825.5; 379/57, 59; 370/85, 85.3

[56] References Cited

U.S. PATENT DOCUMENTS

| | | | |
|---|---|---|---|
| 4,342,995 | 8/1982 | Shima | 340/825.5 |
| 4,347,626 | 8/1982 | Wenzel | 455/57 |
| 4,412,326 | 10/1983 | Limb | 340/825.5 |
| 4,501,017 | 2/1985 | Higgins et al. | 340/825.44 |
| 4,532,626 | 7/1985 | Flores et al. | 370/85 |
| 4,608,559 | 8/1986 | Friedman et al. | 370/85.3 |
| 4,644,105 | 2/1987 | Cameron | 340/825.44 |
| 4,644,351 | 2/1987 | Zabarsky et al. | 455/53 |
| 4,689,785 | 8/1987 | Toyonaga et al. | 370/85.3 |
| 4,757,460 | 7/1988 | Bione | 340/825.5 |

FOREIGN PATENT DOCUMENTS 1273627  7/1968  Fed. Rep. of Germany ........ 455/57

*Primary Examiner*—Curtis A. Kuntz
*Attorney, Agent, or Firm*—Sughrue, Mion, Zinn, Macpeak & Seas

[57] ABSTRACT

A single-frequency signal communications system such as a paging network includes plural communication groups, each of which includes one master station and plural slave stations. The master stations of at least adjacent groups are within each others' reception zones. To avoid signal collision problems, each master station refrains from initiating transmission of a data signal unitl it has failed to detect the carrier signal of any other master station for a time period T. The designated slave station acknowledges receipt of the data signal by transmitting an acknowledgment signal within a period t after receiving the data signal. The time period T is greater than the time period t in order to avoid master station-slave station signal collision problems.

8 Claims, 4 Drawing Sheets

RADIO COMMUNICATION SYSTEM HAVING MEANS FOR AVOIDING SIGNAL COLLISION

BACKGROUND OF THE INVENTION

The present invention relates to a radio communication system and, particularly, a radio communication system in which a plurality of communication groups each having a master station and at least one slave station use a single common carrier frequency.

For example, in the so-called paging system in which data is sent from a master station to a slave station unidirectionally, it is impossible to know, at the master station, whether or not the data is received by the slave station. Therefore, a system for sending a data receipt acknowledgment signal from the slave station has been proposed. Such a system, however, would operate smoothly only when each group uses one or more frequencies which are different from those of other groups. That is, when all of the groups use one frequency commonly, the problem of signal collision is unavoidable.

The signal collision problem may include the collision between signals from different master stations and a collision between signals from a slave station of one group and a master station of another group, etc. In order to avoid such signal collisions, it is possible for one station to detect a carrier frequency from another station and transmit a signal during a time in which the carrier frequency is not used by the other station. In such a system, however, both the master station and the slave station must have carrier sense functions, respectively. Further, in such a case, it is impossible, at the side of the master station, to know when it can expect to receive a reception acknowledging signal from the slave station. Further, since it is generally difficult to determine, at the side of the slave station, where the slave station itself is located in the service area of the master station to which it belongs and there may be a case where the master station can not sense the carrier from the slave station.

SUMMARY OF THE INVENTION

Therefore, an object of the present invention is to provide a radio communication system in which the master stations have carrier sensing functions, respectively, to thereby avoid the signal collision problem.

Another object of the present invention is to provide a radio communication system in which a plurality of communication groups each including a master station and at least one slave station can use a single common carrier frequency, while avoiding the signal collision problem.

According to the present invention, there is provided a radio communication system comprising a plurality of communication groups each including a master station and at least one slave station, said communication groups being adapted to use a single common frequency, wherein the master station includes means for sensing a carrier wave of the common frequency, wherein the master station transmits a data signal when it does not detect the carrier wave for a first predetermined time period, and wherein the slave station transmits an acknowledgment signal, upon reception of the data, within a second predetermined time period shorter than the first predetermined time period.

BRIEF DESCRIPTION OF THE DRAWINGS

The above and other objects and features of the present invention will become apparent from reading the following description of preferred embodiments of the present invention with reference to the accompanying drawings in which.

DETAILED DESCRIPTION OF THE PREFERRED EMBODIMENTS

Figure 1:
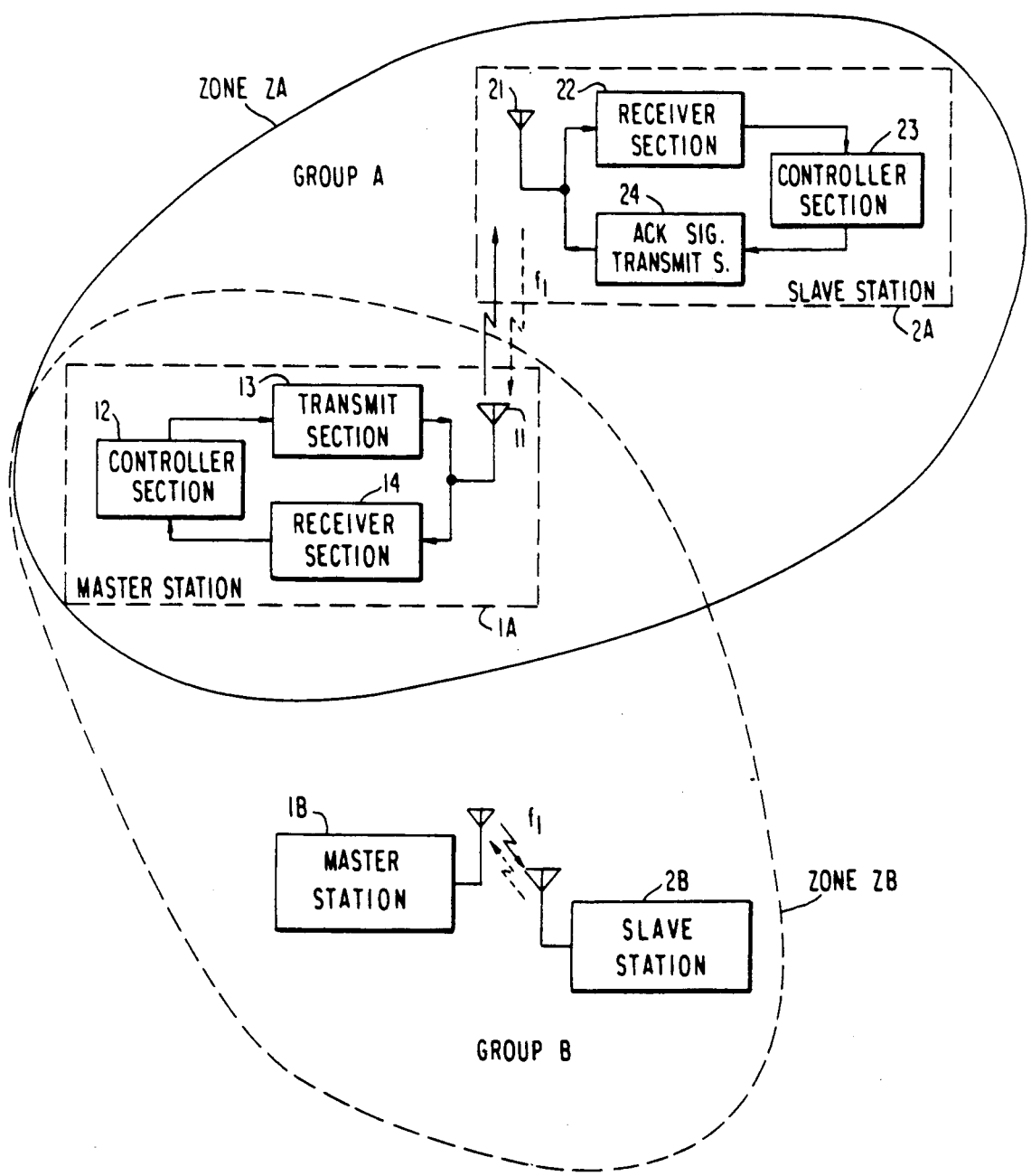
FIG. 1 is a block diagram showing an embodiment of the radio communication system according to the present invention.

In FIG. 1, a radio communication system according to the present invention includes a pair of communication groups A and B which commonly use a carrier frequency $f_1$. Three or more communication groups may be included in this system. The communication group A includes a master station 1A and a slave station 2A and the group B includes a master station 1B and a slave station 2B. Any number of slave stations in each communication group may. The service zone of the group A is shown by a solid line ZA and that of the group B is shown by a dotted line ZB. In this embodiment, the service zones of the groups A and B overlap each other and thus interference in communication may occur in the overlapped zone.

The master station 1A is composed of a transmitter section 13 for sending data from a controller section 12 to the slave station 2A over the carrier frequency $f_1$, and a receiver section 14 for receiving an acknowledgment signal which is sent by the slave station 2A, upon reception of the data, over the same frequency. The receiver section 14 of the master station 1A has a carrier sense function and can thus determine whether or not the carrier is being used by the slave station 2A and/or the communication group B. The slave station 2A is composed of a receiver section 22 tuned to the carrier frequency $f_1$, a controller section 23 for controlling the operation of the slave station 2A and a transmitter section 24 for sending an acknowledgment signal ACK to the master station 1A. Since the master station 1B and the slave station 2B are constituted of components identical to those of the master station and the slave station of group A, and operate in same way as those of the group A, the operation of only the communication group A will be described with reference to FIG. 2.

Figure 2:
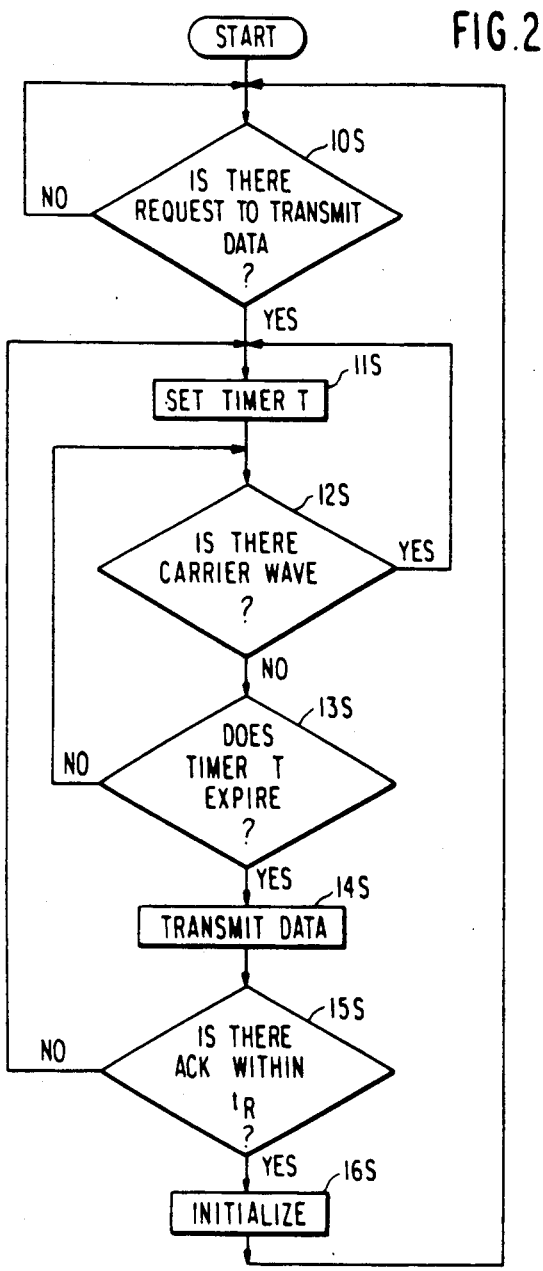
FIG. 2 is a flow chart showing the operation of a controller section of a master station in FIG. 1.

In FIG. 2, the controller section 12 of the master station 1A determines, at step 10S, whether or not a data transmission is requested, and operates to set a carrier sense timer having a time T, at step 11S, every time a data transmission request occurs. Then, before the time period T of the timer expires the controller section 12 monitors whether or not the carrier frequency $f_1$ is being used by any other station, at steps 12S and 13S, respectively. When the carrier frequency $f_1$ is not sensed within the time period T, the operation is shifted to a data transmission phase in step 14S. On the other hand, when it is sensed that the carrier is being used in step 12S, the operation is returned to step 11S in which the timer is again set. The operations in steps 11S, 12S and 13S are repeated until the carrier disappears in the time period T.

After data transmission is completed at step 14S, it is determined, at step 15S, whether or not the acknowledgment signal ACK from the slave station 2A is received by the master station 1A within a subsequent time period $t_R$. The time period $t_R$ is set shorter than the time T to prevent signal collision between the acknowledgment signal ACK and the data signal of the other group B from occuring. When it is determined, at step 15S, that the acknowledgment signal ACK is received by the master station 1A, an initialization operation such as the resetting of the timer is performed at step 16S and the operation is returned to the step 10S to wait for the next data transmission request. When the acknowledgment signal is not received by the master station 1A within the time period $t_R$, the operation is returned from step 15S to step 11S to send the data again.

Figure 3:
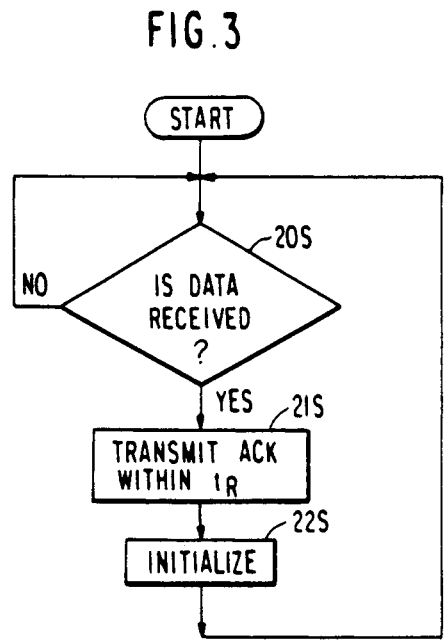
FIG. 3 is a flow chart showing the operation of a controller section of a slave station in FIG. 1.

In FIG. 3, which is a flow chart of the operation of the slave station 2A, the controller section 23 of the slave station 2A checks at step 20S whether or not data is received thereby. When data is received, the acknowledgment signal ACK is sent within the time $t_R$ subsequent to the data reception, at step 21S. Thereafter, the timer is initialized at step 22S and the operation is returned to step 20S.

Figure 4:
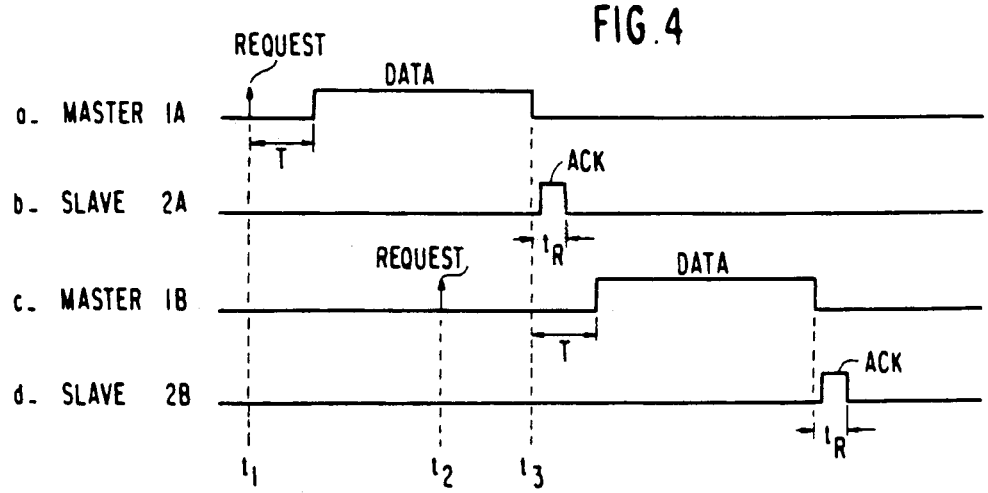
FIG. 4 is a time chart for an explanation of an operation of the communication system shown in FIG. 1.

The merits of the present invention described heretofore will be described in more detail with reference to FIG. 4. The master station 1A, which is located in the overlapped area, i.e., the interference zone, as shown in FIG. 1, begins its monitoring of the carrier when a data transmission request occurs at a time $t_1$, and continues this monitoring for the time period T. When there is no carrier detected within the time T, the data then transmitted thereby. When the slave station 2A receives the data thus transmitted, it transmits the acknowledgment signal within the time $t_R$ after the time $t_3$ at which the data reception is ended.

When there is a data transmission request at the master station 1B of group B at a time $t_2$ when the master station 1A of group A is using the carrier frequency $f_1$ to transmit data, the master station 1B does not start to transmit its data until after the time T after the time at which the carrier from the master station 1A disappears. Similarly to the slave station 2A, the slave station 2B transmit an acknowledgment signal back to the master station 1B within the time period $t_R$ after data reception thereby. Since the slave station 2A of the group A is outside the interference zone (see FIG. 1), the master station 1B does not detect the carrier after the master station 1A completes its data transmission. If the master station 1B were to start to send its data without first waiting the time T, the transmitted data from the master station 1B might collide with the acknowledgment signal ACK from the slave station 2A in the interference zone, causing the ACK signal not to be received by the master station 1A. On the contrary, in the present invention, the time T is set such that $T>t_R$. Therefore, data transmission from the master station 1B is started after the master station 1A acknowledges reception of the ACK signal from the slave station 2A, and thus such collision of the signals is avoided.

The constructions of the master station and the slave station based on this scheme will be described in detail with reference to FIGS. 5 and 6.

Figure 5:
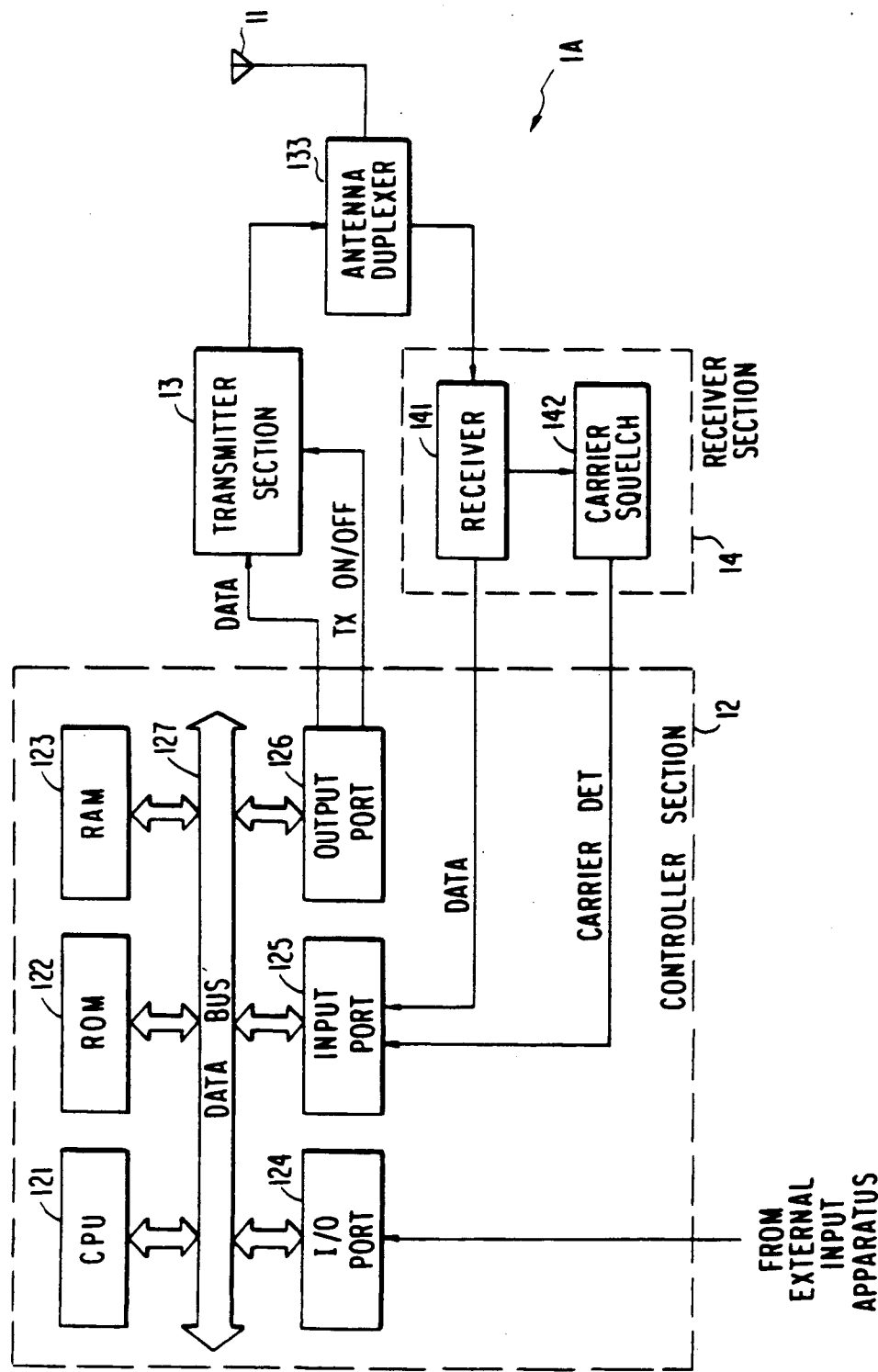
FIG. 5 is a block diagram showing the master station in FIG. 1 in detail.

In FIG. 5, the controller section 12 of the master station 1A includes a central processing unit (CPU) 121 which performs the main portion of the tasks of the station. A control program for the CPU 121 is stored in a read-only memory (ROM) 122 and various control data are stored temporarily in a random access memory (RAM) 123. An input/output (I/O) port 124 functions as an interface to an external data input device, through which the data transmission request etc. are input thereto. In a paging interrogation input device, the I/O port 124 is usually constructed using a device of the RS-232-C type. The data to be transmitted in the interrogation input device of the paging system includes an identification (ID) number of the slave station designated.

An input port 125 functions to read-in the reception data, i.e., the ACK signal and the carrier detection information from the receiver section 14. An output port 126 transmits the data to the transmitter section 13 and supplies an on-off control signal thereto. Reference numeral 127 designates a data bus.

The receiver section 14 includes a receiver 141 and a carrier squelch circuit 142. The receiver 141 is usually an FM receiver tuned to the frequency $f_1$. The squelch circuit 142 may be of any type which responds to an IF signal of the receiver 141 to detect the presence of the carrier. The transmitter section 13 may be an FM transmitter capable of transmitting data at the frequency $f_1$. Reference numeral 133 denotes an antenna duplexer.

Figure 6:
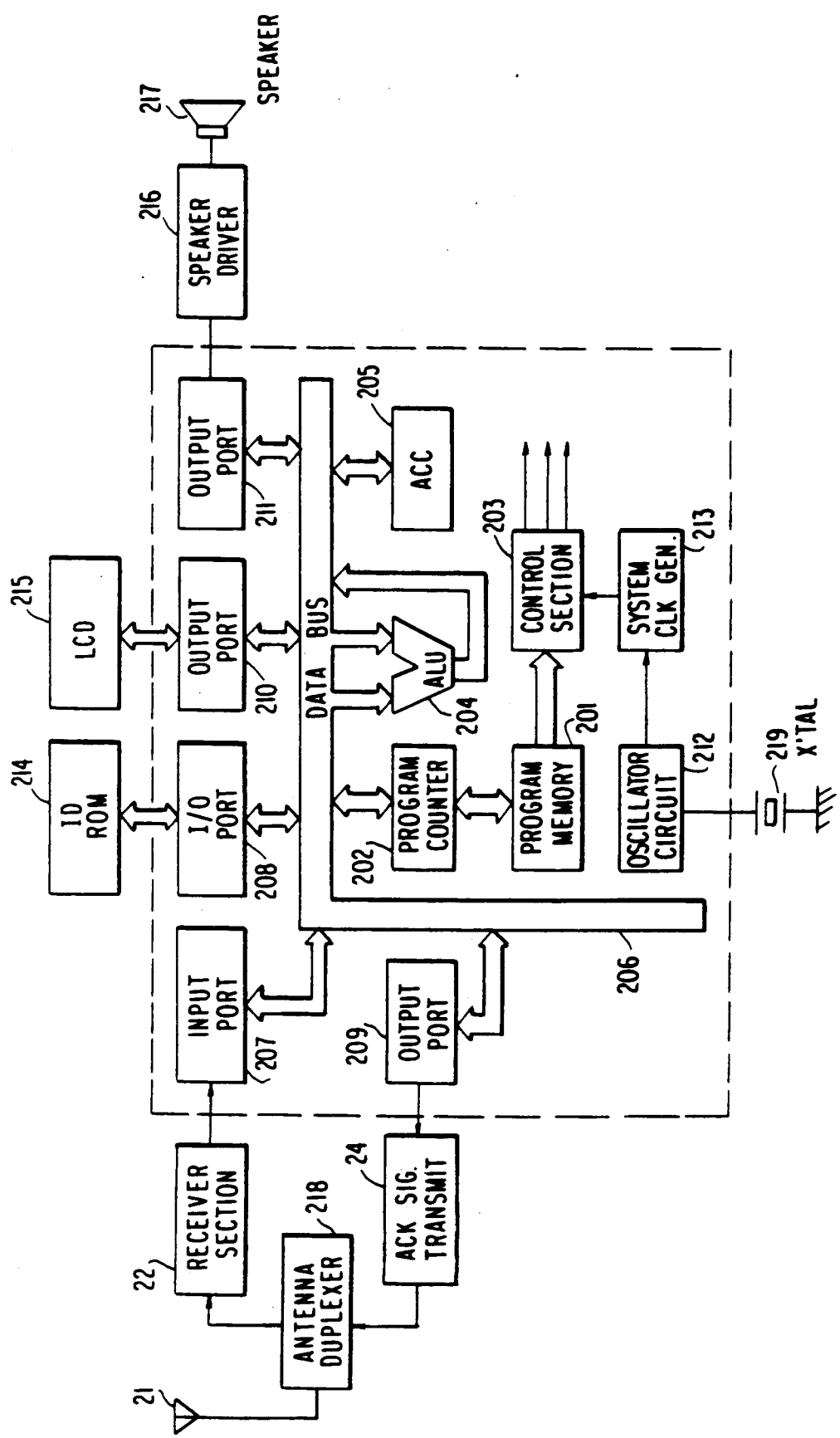
FIG. 6 is a block diagram showing the slave station in FIG. 1 in detail.

In FIG. 6, the slave station 1B is a paging transmitter/receiver which includes a one chip CPU 200. The CPU 200 includes elements 201 to 213. A program for controlling the receiving and transmitting of signals in the slave station is stored in a memory 201. A program counter 202 counts each time a command is read out from the program memory 201. A control section 203 responds to the command from the memory 201 to supply control signals to the various portions of CPU 200. Reference numerals 204, 205, 206 and 207 denote an arithmetic and logic circuit (ALC), an accumulator (ACC), an internal bus and an input port for reading in data from the receiver section 22, respectively.

An I/O port 208 is used to read out an ID number from an ROM 214 storing the ID number of the slave station. An output port 209 is used to output transmission data to the transmitter section 24. Display data is supplied through an output port 210 to an external liquid crystal device (LCD) 215. A drive signal for driving a loudspeaker 217 is supplied through an output port 211 to a driver 216. An oscillation output of an oscillator circuit composed of a quartz oscillator 219 and an internal oscillator 212 is supplied to a system clock generator 213 from which clock signals having predetermined periods are supplied to various portions of CPU 200. Reference numeral 218 designates an antenna duplexer. The slave station as constructed above transmits the ACK signal in the steps shown in FIG. 3 only when the ID number contained in the received data coincides with the ID number contained in its own ROM 214.

As described hereinbefore, according to the present invention, it is possible to avoid signal collisions between the master station and the slave station and between groups having the overlapped service areas by providing the respective master stations with a carrier detection capability.

What is claimed is:

1. A radio communication system, comprising; a plurality of communication groups each including a master station and at least one slave station, said communication groups being adapted to use a single common frequency, wherein each said master station includes means for sensing a carrier wave of said common frequency, and means for preventing said master station from transmitting a data signal over said common frequency until said master station has failed to detect said carrier wave for a first predetermined time period, and wherein each said slave station includes means responsive to reception of said data signal for transmitting an acknowledgement signal over said common frequency, within a second predetermined time period from the termination of reception of said data signal, said second predetermined time period being shorter than said first predetermined time period.

2. A radio communication system as claimed in claim 1, wherein service areas of at least two of said communication groups partially overlap each other.

3. A radio communication system as claimed in claim 1, wherein said means for sensing said carrier wave comprises a carrier squelch circuit.

4. A radio communication system as claimed in claim 1, wherein said data signal transmitted from said master station includes an identification number designating a slave station, and wherein each said slave station compares said identification number included in said data signal received thereby with an identification number stored therein and transmits said acknowledgment signal only when both of said identification numbers are coincident with each other.

5. A method of avoiding signal collisions in a radio communication system including a plurality of communication groups, each including a master station and at least one slave station and using a signal frequency, comprising the steps of:

monitoring a carrier wave of said frequency at each said master station;

transmitting data from a master station over said frequency only when no carrier wave has been detected at said master station for a first predetermined time period;

receiving said data at a slave station; and responsive to reception of said data, transmitting an acknowledgement signal from said slave station over said frequency within a second predetermined time period from the termination of reception of said data, said second predetermined time period being shorter than said first predetermined time period.

6. A method as claimed in claim 5, wherein service areas of at least two of said communication groups partially overlap each other.

7. A method as claimed in claim 5, wherein the step of monitoring is performed using an output of a squelch circuit.

8. A method as claimed in claim 5, further comprising the steps of:

inserting a first identification number designating said slave station into said data;

storing a second identification number in said slave station;

comparing said first identification number inserted into said data and received by said slave station with said second identification number stored therein; and transmitting said acknowledgment signal only when both said identification numbers are coincident.

* * * * *